United States Patent
Nowarra et al.

(10) Patent No.: US 11,607,293 B2
(45) Date of Patent: Mar. 21, 2023

(54) METHOD FOR CONSTRUCTING AT LEAST ONE DENTAL PROSTHETIC PART OR A BRACKET HAVING AT LEAST ONE ADHESIVE SURFACE

(71) Applicant: DENTSPLY SIRONA inc., York, PA (US)

(72) Inventors: Oliver Nowarra, Leimen (DE); Joachim Pfeiffer, Bensheim (DE); Peter Fornoff, Reichelsheim (DE)

(73) Assignee: DENTSPLY SIRONA INC., York, PA (US)

(*) Notice: Subject to any disclaimer, the term of this patent is extended or adjusted under 35 U.S.C. 154(b) by 482 days.

(21) Appl. No.: 16/344,860

(22) PCT Filed: Nov. 3, 2017

(86) PCT No.: PCT/EP2017/078122
§ 371 (c)(1),
(2) Date: Apr. 25, 2019

(87) PCT Pub. No.: WO2018/083207
PCT Pub. Date: May 11, 2018

(65) Prior Publication Data
US 2020/0046465 A1    Feb. 13, 2020

(30) Foreign Application Priority Data
Nov. 3, 2016 (DE) .......................... 102016221541.8

(51) Int. Cl.
*A61C 7/16* (2006.01)
*A61C 5/30* (2017.01)
(Continued)

(52) U.S. Cl.
CPC .................. *A61C 7/16* (2013.01); *A61C 5/30* (2017.02); *A61C 8/0093* (2013.01);
(Continued)

(58) Field of Classification Search
None
See application file for complete search history.

(56) References Cited

U.S. PATENT DOCUMENTS 3,760,502 A    9/1973  Hirsch
4,243,386 A *  1/1981  Kawaguchi .............. A61C 7/16
                                                        433/9
(Continued)

FOREIGN PATENT DOCUMENTS

CH           614621 A5      12/1979
DE        10300010 A1 *     7/2004
(Continued)

OTHER PUBLICATIONS

International Search Report; PCT/EP2017/078122; dated Jan. 9, 2018 (completed); Jan. 23, 2018 (mailed).
(Continued)

*Primary Examiner* — Tae H Yoon
(74) *Attorney, Agent, or Firm* — Dentsply Sirona Inc.

(57) ABSTRACT

The invention relates to a method for constructing at least one dental prosthetic part or a bracket, with at least one adhesive surface, in which a 3D model is made of the dental prosthetic part. Recesses are constructed on the adhesive surface of the 3D model.

18 Claims, 1 Drawing Sheet

(51) Int. Cl.
  *A61C 8/00* (2006.01)
  *B29C 64/386* (2017.01)
  *G06F 30/10* (2020.01)
  *A61C 13/00* (2006.01)
  *A61C 13/34* (2006.01)
  *A61C 7/00* (2006.01)
  *G06T 19/20* (2011.01)

(52) U.S. Cl.
  CPC .......... *A61C 13/0004* (2013.01); *A61C 13/34* (2013.01); *B29C 64/386* (2017.08); *G06F 30/10* (2020.01); *A61C 7/002* (2013.01); *A61C 13/0019* (2013.01); *G06T 19/20* (2013.01)

(56) References Cited

U.S. PATENT DOCUMENTS

| | | | |
|---|---|---|---|
| 4,604,057 A | 8/1986 | Viglietti | |
| 4,842,513 A | 6/1989 | Haarmann | |
| 5,820,371 A | 10/1998 | Foerster | |
| 9,700,383 B2 | 7/2017 | Schiemann | |
| 10,179,034 B2 | 1/2019 | Scheimann | |
| 2006/0257824 A1 | 11/2006 | Pfeiffer | |
| 2009/0029320 A1* | 1/2009 | Auderset | A61C 13/2653 433/182 |
| 2010/0028835 A1 | 2/2010 | Hansen | |
| 2011/0207072 A1 | 8/2011 | Scheimann | |
| 2012/0251979 A1* | 10/2012 | Karim | A61C 8/0051 433/201.1 |
| 2013/0326878 A1* | 12/2013 | Boehm | B33Y 80/00 29/896.1 |
| 2016/0302887 A1 | 10/2016 | Schiemann | |

FOREIGN PATENT DOCUMENTS

| | | |
|---|---|---|
| DE | 102006044215 B4 * | 2/2014 |
| JP | S61500304 A | 2/1986 |
| JP | H06007377 A | 1/1994 |
| JP | 2002360606 | 12/2002 |
| JP | 2006167212 A | 6/2006 |
| WO | 2006120254 A2 | 11/2006 |

OTHER PUBLICATIONS

Written Opinion of the International Searching Authority; PCT/EP2017/078122; dated Jan. 9, 2018 (completed); Jan. 23, 2018 (mailed).

International Preliminary Report on Patentability; PCT/EP2017/078122; dated May 7, 2019 (issued).

Japanese Office Action dated Nov. 22, 2021.

* cited by examiner

METHOD FOR CONSTRUCTING AT LEAST ONE DENTAL PROSTHETIC PART OR A BRACKET HAVING AT LEAST ONE ADHESIVE SURFACE

CROSS-REFERENCE TO RELATED APPLICATIONS

This is a National Phase application of International Application No. PCT/EP2017/078122 filed on Nov. 3, 2017, which claims the benefit of and priority to German Application No. 102016221541.8, filed on Nov. 3, 2016, which are herein incorporated by reference for all purposes.

TECHNICAL FIELD

The invention relates to a method for constructing at least one dental prosthetic part or a bracket having at least one adhesive surface, in which a 3D model is made of the dental prosthetic part.

BACKGROUND OF THE INVENTION

A number of methods for constructing and producing dental prosthetic parts are known from the state of the art.

DE 10 2005 023 106 A1 discloses a method for producing a dental prosthetic part, wherein the framework is connected to the veneer part by means of an adhesive connection. A gap filled with a connecting means is provided in a connecting layer. The spacing elements of the veneer part are in direct contact with the framework.

DE 10 2006 044 215 B4 discloses a method for optimizing an insertion direction of a 3D model of a dental prosthetic part, wherein the partitioned regions on the surface of the preparations are marked in color.

One disadvantage of the known dental prosthetic parts with adhesive surfaces is that the adhesive connection of the dental prosthetic parts is not stable enough to withstand long-term compressive loading. In practice, therefore, the adhesive connection sometimes breaks or releases as a result of the long-term compressive loading.

The object of the present invention is therefore to provide a method and a dental prosthetic part having an adhesive surface that ensures a stable adhesive connection.

SUMMARY OF THE INVENTION

The invention relates to a method for constructing at least one dental prosthetic part or a bracket having at least one adhesive surface, in which a 3D model is made of the dental prosthetic part. Recesses are constructed on the adhesive surface of the 3D model.

The dental prosthetic part can be any dental prosthetic part, such as a full crown, a partial crown, a veneer for an anterior tooth, a veneer for a cuspid, a veneer-framework, a multi-unit dental prosthetic part or a Ti base with a crown to be set upon it. A veneer-framework comprises a framework, for example consisting of a noble metal alloy or a non-noble metal alloy, and a veneer, for example consisting of a ceramic, that is adhesively bonded to the framework. The framework can encompass multiple teeth, wherein a single veneer of an artificial tooth is placed onto each framework part and adhesively bonded. The inner surface of the veneer therefore comprises a first adhesive surface, while the framework comprises a second adhesive surface. The adhesive connection is thus established between the first adhesive surface and the second adhesive surface.

If the dental prosthetic part is a full crown that is connected to a mesostructure, such as an abutment, the inner surface of the full crown comprises a first adhesive surface, while the outer surface of the mesostructure comprises a second adhesive surface.

If the dental prosthetic part is a veneer of an anterior tooth, the veneer comprises a first adhesive surface, while the adhesive connection is established directly between the adhesive surface and the tooth substance. When using a Ti base as a component of the dental prosthetic part, the Ti base, for example consisting of a titanium alloy, is connected to a set implant, whereby either a mesostructure, such as an abutment, is adhesively bonded to the Ti base as an intermediate part or a full crown is adhesively bonded to said Ti base directly. The inner surface of the mesostructure or the inner surface of the full crown then comprises a first adhesive surface while the outer surface of the Ti base comprises a second adhesive surface, wherein a first adhesive connection is established between the Ti base and the inner surface of the mesostructure and a second adhesive connection is subsequently established between the outer surface of the mesostructure and the inner surface of the full crown.

The method can also be used with a bracket, wherein the adhesive surface of the bracket is provided with recesses, wherein the adhesive connection is established between the adhesive surface of the bracket and the surface of the tooth.

The 3D model of the dental prosthetic part includes all the information about the surface of the dental prosthetic part to be produced and is constructed by means of a conventional CAD device.

The recesses on the at least one adhesive surface of the dental prosthetic part have any shape that ensures an improved stability of the adhesive connection.

One advantage of this method is that the surface area of the adhesive surface is enlarged by the recesses on the adhesive surface of the dental prosthetic part, thus improving the stability of the adhesive connection.

Another advantage of this method is that the recesses on the adhesive surface are already added during the planning of the 3D model, so that the production of the dental prosthetic part with the recesses on the adhesive surface can be carried out automatically by means of a production device, such as a CAD/CAM device, or by means of a 3D printer.

The surface area of the adhesive surface of the 3D model can advantageously be enlarged by means of the recesses.

The stability of the adhesive connection is therefore improved by the enlarged surface area of the adhesive surface of the 3D model. This is because adhesive is also pressed into the recesses during the adhesive bonding of the dental prosthetic part, so that carrier structures are formed as the adhesive cures.

Advantageously, specific surface regions of the adhesive surface of the 3D model can be selected to be provided with recesses.

Specific surface regions of the adhesive surface to be provided with the recesses are thus selected. These surface regions then possess a more stable adhesive connection, so that the dental prosthetic part can absorb higher tensile loads and compressive loads.

The selection of the surface regions can advantageously be carried out manually by a user or automatically by means of a computer unit.

The surface areas can thus be selected by a user, for example, whereby the user selects the surface regions on the 3D model that is displayed by means of a display device, such as a monitor.

For the automatic selection of the surface regions, an insertion axis of the 3D model can advantageously be identified, wherein a surface normal of the adhesive surface of the 3D model is identified, wherein surface regions of the adhesive surface are selected that form an angle between the insertion axis and the surface normal of said surface regions that has at most a set value.

The insertion axis of the 3D model corresponds to an insertion direction when the dental prosthetic part to be produced is placed onto the provided mesostructure or onto the provided tooth stump.

As a result, therefore, the surface regions that are subjected to the greatest amount of stress in the event of a compressive load or a tensile load are provided with recesses. In the case of molars, a force direction of the compressive load during a chewing movement corresponds approximately to the orientation of the insertion axis.

The set value of the angle between the insertion axis and the surface normal of the surface regions can advantageously be at most 60°.

Therefore, only surface regions that form an angle between the insertion axis and the surface normal that is at most 60° are selected as an adhesive surface. By using a defined angle of at most 60°, the particularly stressed surface regions of the adhesive surface are selected.

For the automatic selection of the surface regions, a surface normal of the adhesive surface of the 3D model can advantageously be identified, wherein a force direction of a force acting on the planned dental prosthetic part is identified, wherein surface regions of the adhesive surface are selected that form an angle between the force direction and the surface normal of said surface regions that has at most a set value.

The force acting on the dental prosthetic part arises during a chewing movement, for example, wherein, in particular in the case of molars, the force direction of said force can approximately correspond to the orientation of the insertion axis. During the selection, therefore, particularly stressed surface regions of the adhesive surface are provided with recesses, in order to produce a higher stability of the adhesive connection in said surface regions.

The set value of the angle between the force direction and the surface normal of the surface regions can advantageously be at most 60°.

As a result, therefore, particularly stressed surface regions are selected.

Advantageously, for the automatic selection, only surface regions of the adhesive surface can be selected, in which the 3D model of the dental prosthetic part has a thickness that is greater than a predetermined minimum wall thickness.

This ensures that the recesses are only constructed in regions with a sufficient wall thickness.

The set minimum wall thickness can advantageously be 500 μm.

At this minimum wall thickness, the required mechanical stability of the dental prosthetic part to be produced is ensured.

The distribution of the recesses within the selected surface regions can advantageously be uniform, or can be dependent on a force acting on the planned dental prosthetic part.

A uniform reinforcement of the adhesive connection is achieved with a uniform distribution of the recesses. For a distribution of the recesses that is dependent on the acting force, the density of the constructed recesses is increased in regions of the adhesive surfaces in which there is a higher acting force.

For the construction of the recesses, a shape, a depth or a size of an individual recess can advantageously be determined manually by a user or automatically by means of a computer unit.

The recesses are thus defined in detail.

For the construction of the recesses, a pattern of the recesses, a profile of the recesses and a symmetry of the recesses can advantageously be determined manually by a user or automatically by means of a computer unit.

The recesses are thus constructed automatically.

The dental prosthetic part to be constructed can advantageously be a bridge consisting of a number of bridge elements, wherein the distributions of the recesses on the individual bridge elements are coordinated by taking into account a force acting on the bridge with at least one specified force direction.

The stability of the adhesive connection of the bridge is thus improved.

With respect to their shape, size, depth and/or distribution, the recesses can advantageously be defined manually by a user or automatically by means of a computer unit depending on an adhesive used, a material used for the dental prosthetic part to be produced and/or depending on whether an additive or a subtractive manufacturing method is used.

The stability of the adhesive connection when using a specific adhesive and a specific material for the dental prosthetic part is thus improved.

The dental prosthetic part can advantageously consist of at least two adhesive parts, wherein the recesses are constructed on a first adhesive surface of a first adhesive part and on a second adhesive surface of a second adhesive part.

The adhesive partners or adhesive parts are thus provided with recesses on the adhesive surfaces, in order to improve the stability of the adhesive connection.

The invention further relates to a method for producing a dental prosthetic part using a 3D model. In doing so, the 3D model was constructed according to the abovementioned method.

According to this method, the dental prosthetic part is produced using the planned 3D model.

One advantage of this production method is that the dental prosthetic part can be produced in a fully automatic manner using the constructed 3D model with recesses.

The dental prosthetic part can advantageously be produced from a blank using a CAD/CAM method, wherein the dental prosthetic part having the constructed recesses is produced in one process step using the constructed 3D model.

The CAD/CAM method can be carried out using a conventional CAD/CAM device. A conventional CAD/CAM device comprises a CAD unit, such as a computer, for constructing the 3D model, and a CAM unit, such as a processing machine, for example having four processing axes or five processing axes, and a CAM computer for calculating the machine movements of the processing machine.

A blank made of a ceramic material is clamped into the processing machine and automatically processed by the processing machine, wherein the dental prosthetic part is milled according to the constructed 3D model. Therefore, according to this embodiment of the production method, the dental prosthetic part is produced with the recesses in one process step according to the constructed 3D model.

The dental prosthetic part can advantageously be produced from a blank using a CAD/CAM method, wherein the dental prosthetic part is produced without recesses in a first process step using the constructed 3D model, wherein the constructed recesses are carved out later in a second process step using the CAD/CAM method.

In this embodiment of the production method, the dental prosthetic part is first produced without recesses in a first process step and the recesses are subsequently carved out in a second process step.

The processing machine can also comprise only three operating axes. Conventional cylindrical processing tools or undercut milling cutters can be used as processing tools.

The dental prosthetic part can advantageously be produced using the CAD/CAM method by means of a CAD/CAM device comprising a CAD unit, a CAM unit and a control device for machine movements of a manufacturing machine, wherein the recesses are constructed with the aid of software of the CAD unit, with the aid of software of the CAM unit and/or with the aid of the control device for machine movements.

The recesses are thus already added during construction with the aid of the software of the CAD unit, with the aid of the software of the CAM unit or only with the aid of the control device for machine movements.

The recesses can advantageously have the shape of a hemisphere, a cube, a cuboid or a pyramid.

The production of the recesses is thus simplified.

Advantageously, a special tool having the shape of the recess or recesses to be produced can be used to carve out the recesses, so that a recess or a number of recesses are carved out in one process step in a single use of the special tool.

The recesses can thus be produced more quickly using the special tools.

The dental prosthetic part can advantageously be produced using an additive manufacturing method.

A conventional 3D printer for producing ceramic dental prosthetic parts, for example, can be used for the additive manufacturing method. The 3D printer can be based on an SLS laser sintering method and/or a stereolithography method, for example.

With a 3D printer based on an SLS laser sintering method, the printing of three-dimensional objects without binding agents or additional assembly steps is made possible. The 3D model of the object to be produced is broken down into numerous horizontal planes by means of special slicing software and passed on to the 3D printer as control commands. From a powder bed of the used material, the 3D printer then builds the object layer by layer, wherein individual powder particles are fused together with a high temperature of the laser. The object is subsequently lowered and a new powder layer is applied. The process is repeated until the entire three-dimensional object is completely printed.

The use of an additive manufacturing method has the advantage that not only bores or conically tapering openings are possible as recesses; recesses with a narrow inlet channel and a wide volume within the material of the dental prosthetic part are possible as well. These types of recesses provide a more stable adhesive connection.

The form of the recess can advantageously comprise a cylindrical channel having a first set diameter and a cavity having a second set diameter that exceeds the first diameter of the channel.

The adhesive connection is thus more stable, because the adhesive is pressed into the cavity through the cylindrical channel, solidifies and consequently creates a positive-locking fit.

The shape of the recess can advantageously be a cylindrical channel, the axis of which exceeds an angle of 45° relative to an insertion axis of the dental prosthetic part.

The stability of the adhesive connection is thus improved, because a positive-locking fit is created between the cylindrical channel and the hardened adhesive when a force is exerted along the insertion axis of the dental prosthetic part.

A number of recesses can advantageously have the form of channels, which are connected to one another at their ends within the dental prosthetic part by a further channel.

The stability of the adhesive connection is thus improved, because the further channel between the two inlet channels creates a positive-locking fit.

The material of the dental prosthetic part can advantageously be a plastic, a ceramic, a metal or a mixture of a plastic and a ceramic.

A conventional material is thus used for producing the dental prosthetic part.

The invention further relates to a dental prosthetic part having at least one adhesive surface, wherein recesses are arranged on the adhesive surface of the dental prosthetic part.

The dental prosthetic part can be constructed using the abovementioned construction method and produced using the abovementioned production method.

One advantage of such a dental prosthetic part with recesses is that, compared to conventional dental prosthetic parts, the stability of the adhesive connection is stronger.

The adhesive surface of the dental prosthetic part can advantageously be formed such that, when the dental prosthetic part is adhesively bonded to a preparation, only contact surfaces of the adhesive surface in the outer region of the adhesive surface come into contact with the preparation, wherein the adhesive surface in the inner region of the adhesive surface has no direct contact with the preparation, so that a continuous adhesive film consisting of an adhesive is formed between the adhesive surface of the dental prosthetic part and the preparation.

The stability of the adhesive connection is thus improved, because the adhesive film is not discontinuous.

The dental prosthetic part can advantageously consist of at least two adhesive parts, wherein the recesses are constructed on a first adhesive surface of a first adhesive part and on a second adhesive surface of a second adhesive part for the purpose of adhesively bonding the two parts to one another.

The adhesive connection between the two adhesive parts is thus improved.

The dental prosthetic part consisting of at least two adhesive parts can advantageously be a veneer-framework, a multi-unit dental prosthetic part, a dental prosthetic part comprising a mesostructure with a crown to be set upon it and/or a dental prosthetic part comprising a Ti base with at least one crown to be set upon it.

BRIEF DESCRIPTION OF THE DRAWINGS

The invention is explained with reference to the drawings. The drawings show.

DETAILED DESCRIPTION OF THE INVENTION

Figure 1:
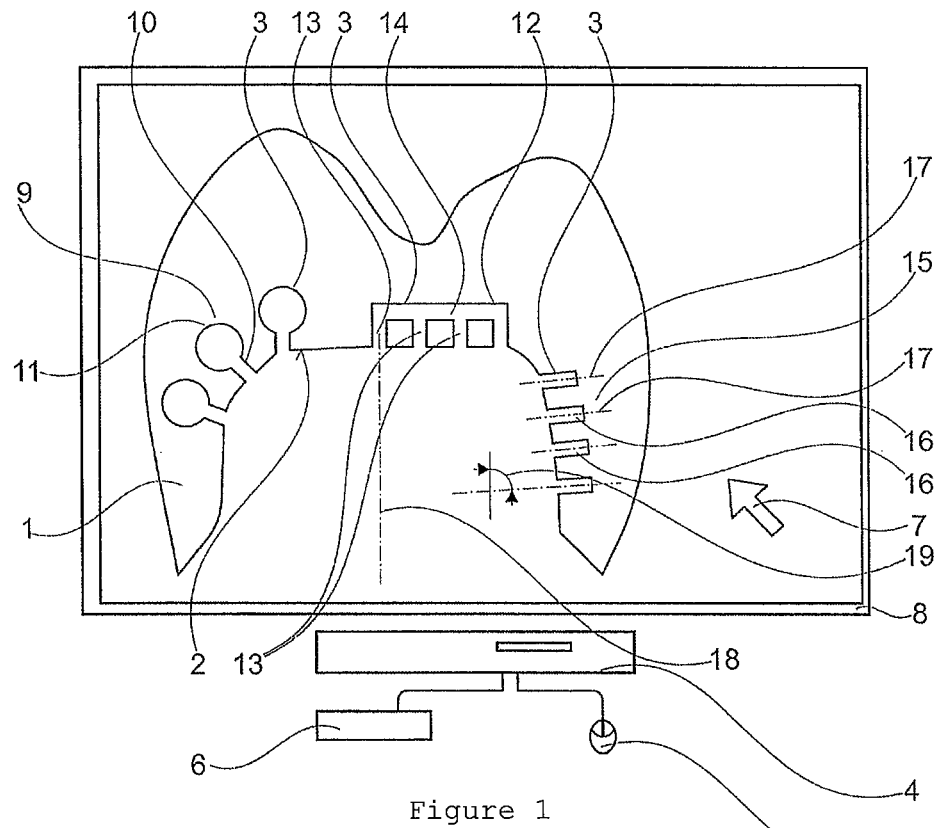
FIG. 1 a sketch to illustrate the method.

FIG. 1 shows a sketch for illustrating the method for constructing at least one dental prosthetic part having at least one adhesive surface, in which a 3D model 1 is made of the dental prosthetic part. Recesses 3 are constructed on an adhesive surface 2. The 3D model 1 is constructed by means of a CAD device, such as a computer 4. Input means, such as a mouse 5 and a keyboard 6, which allow the user to process the 3D model 1 by means of a cursor 7, are connected to the computer 4. The 3D model 1 is graphically displayed by means of a display device 8, such as a monitor, that is connected to the computer 4. A first recess type 9 comprises a cylindrical channel 10 and a wider cavity 11 in the interior of the 3D model 1. A second recess type 12 comprises at least two cylindrical inlet channels 13 and a transverse channel 14, which connects the ends of the inlet channels in the interior of the 3D model 1. A third recess type 15 comprises cylindrical inlet channels 16, the axes 17 of which form an angle with an insertion axis 18 of the 3D model 1 that exceeds 45°. The angle 19 thus ensures a positive-locking fit and consequently a higher stability of the adhesive connection.

Figure 2:
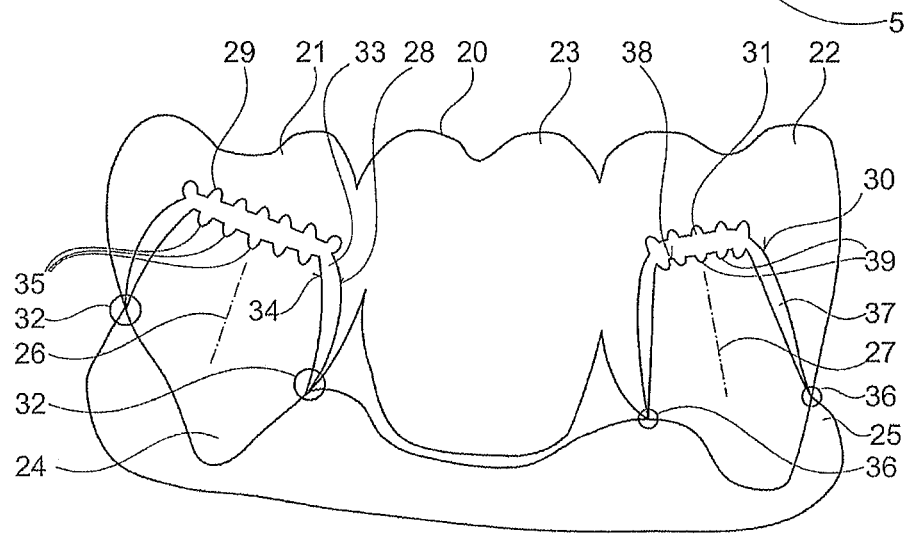
FIG. 2 a dental prosthetic part that was produced by means of a CAM/CAD method in accordance with a constructed 3D model.

FIG. 2 shows a dental prosthetic part 20 that was produced by means of a CAM/CAD method in accordance with a constructed 3D model 1. In the present case, the dental prosthetic part 20 is a bridge consisting of a first bridge element 21, a second bridge element 22 and an intermediate element 23. The bridge is adhesively bonded to a first tooth stump 24 and a second tooth stump 25. The first tooth stump 24 possesses a first insertion direction 26. The second tooth stump 25 possesses a second insertion direction 27. First recesses 29 are provided on a first adhesive surface 28 of the first bridge element 21. Second recesses 31 are provided on a second adhesive surface 30 of the second bridge element 22. The recesses 29 and 31 are in the form of spherical recesses. The first adhesive surface 28 of the dental prosthetic part 20 is shaped such that only first contact surfaces in the outer region of the adhesive surface 28 come into contact with the first tooth stump 24 when said dental prosthetic part 20 is adhesively bonded to the tooth stump 24 of a preparation. The adhesive surface in the inner region has no direct contact with the tooth stump 24, so that a continuous adhesive film 33, consisting of the adhesive, is formed between the adhesive surface 28 and an adhesive surface 34 of the first tooth stump 24. Recesses 35 were also created on the adhesive surface 34 of the tooth stump 24 in order to improve the stability of the adhesive connection. The second adhesive surface 30 of the second bridge element 22 also comprises surfaces 36 in the outer region of the adhesive surface 30 and a continuous adhesive film 37. Recesses 39 were also created on an occlusal surface 38 of the second tooth stump 25 in order to improve the stability of the adhesive connection.

The invention claimed is:

1. A method for constructing at least one dental prosthetic part or a bracket having at least one physical adhesive surface comprising the steps of:
creating a virtual 3D model of the dental prosthetic part or bracket;
constructing, on a virtual surface of the virtual 3D model corresponding to the at least one physical adhesive surface, a plurality of virtual recesses each having a shape,
the plurality of virtual recesses configured to provide a positive locking fit upon installation of the at least one dental prosthetic part or bracket by:
constructing at least one of the plurality of virtual recesses to have a first volume and a second wider volume, the first volume disposed between the virtual surface and the second wider volume, with the first volume comprising a cylindrical channel with a first fixed diameter and the second wider volume being disposed within the virtual 3D model and having a second fixed diameter that exceeds the first fixed diameter of the cylindrical channel; and/or
constructing a number of the plurality of the virtual recesses to have at least two cylindrical inlet channels and a transverse channel, which connects the ends of the at least two cylindrical inlet channels in an interior portion of the virtual 3D model that is farther from the virtual surface relative to an exterior portion of the virtual 3D model that is closer to said virtual surface; and
manufacturing, using the virtual 3D model, the at least one dental prosthetic part or bracket
wherein the method further comprises:
a) selecting specific regions of the virtual surface of the virtual 3D model, wherein the specific surface regions are provided with the virtual recesses, wherein the selection of the surface regions is carried out manually by a user or automatically by means of a computer unit, wherein, for the automatic selection of the surface regions, an insertion axis of the virtual 3D model is identified, wherein a surface normal of the virtual surface of the virtual 3D model is identified, wherein surface regions of the virtual surface are selected that form an angle between the insertion axis and the surface normal of said surface regions that has at most a set value and wherein the set value of the angle between the insertion axis and the surface normal of the surface regions is at most 60°, or
b) selecting specific surface regions of the virtual surface of the virtual 3D model, wherein the specific surface regions are provided with the virtual recesses, wherein the selection of the surface regions is carried out manually by a user or automatically by means of a computer unit, wherein, for the automatic selection of the surface regions, a surface normal of the virtual surface of the virtual 3D model is identified, wherein a force direction of a force acting on the dental prosthetic part or bracket is identified, wherein surface regions of the virtual surface are selected that form an angle between the force direction and the surface normal of said surface regions that has at most a set value, wherein the set value of the angle between the force direction and the surface normal of the surface regions is at most 60°.

2. The method according to claim 1, wherein a surface area of the virtual surface of the virtual 3D model is enlarged by the virtual recesses.

3. The method according to claim 1, wherein, for the automatic selection, only surface regions of the virtual surface in which the virtual 3D model of the dental prosthetic part or bracket has a thickness that is greater than a predetermined minimum wall thickness are selected.

4. The method according to claim 3, wherein the predetermined minimum wall thickness is 500 μm.

5. The method according to claim 4, wherein a distribution of the virtual recesses within the selected surface regions is uniform or dependent on a force acting on the dental prosthetic part or bracket.

6. The method according to claim 1, wherein for the construction of the virtual recesses, the shape, a depth or a size of an individual virtual recess is determined manually by a user or automatically by means of a computer unit.

7. The method according to claim 1, wherein for the construction of the virtual recesses, a pattern of the virtual recesses, a profile of the virtual recesses and a symmetry of the virtual recesses is determined manually by a user or automatically by means of a computer unit.

8. The method according to claim 1, wherein the dental prosthetic part or bracket to be constructed is a bridge having a number of bridge elements, wherein the distributions of the virtual recesses on each of the number of bridge elements are coordinated by taking into account a force acting on the bridge with at least one specified force direction.

9. The method according to claim 1, wherein with respect to the shape, a size, a depth and/or a distribution of each of the virtual recesses, the virtual recesses are set manually by a user or automatically by means of a computer unit depending on an adhesive used, a material used for the dental prosthetic part or bracket to be produced and/or depending on whether an additive or a subtractive manufacturing method is used.

10. The method according to claim 1, wherein the virtual 3D model includes at least two virtual adhesive parts, wherein the virtual recesses are constructed on a first virtual adhesive surface of a first virtual adhesive part and on a second virtual adhesive surface of a second virtual adhesive part.

11. The method according to claim 1, wherein the dental prosthetic part or bracket is manufactured from a blank using a CAD/CAM method, wherein the dental prosthetic part or bracket having constructed recesses is produced in one process step based on the virtual 3D model.

12. The method according to claim 1, wherein the dental prosthetic part or bracket is manufactured from a blank using a CAD/CAM method, wherein the dental prosthetic part or bracket is produced without recesses in a first process step using the virtual 3D model, wherein the constructed recesses are carved out later in a second process step using the CAD/CAM method.

13. The method according to claim 11, wherein the dental prosthetic part or bracket is manufactured using the CAD/CAM method by means of a CAD/CAM device comprising a CAD unit, a CAM unit and a control device for machine movements of a manufacturing machine, wherein the recesses are constructed with the aid of software of the CAD unit, with the aid of software of the CAM unit and/or with the aid of the control device for machine movements.

14. The method according to claim 1, wherein the recesses have the shape of a hemisphere, a cube, a cuboid or a pyramid.

15. The method according to claim 1, wherein the dental prosthetic part or bracket is manufactured using an additive manufacturing method.

16. The method according to claim 15, wherein the shape of the recess is another cylindrical channel, the axis of which exceeds an angle of 45° relative to an insertion axis of the dental prosthetic part or bracket.

17. The method according to claim 1, wherein the material of the dental prosthetic part or bracket is a plastic, a ceramic, a metal or a mixture of a plastic and a ceramic.

18. The method according to claim I, further comprising:
applying an adhesive to the at least one physical adhesive surface and pressing the at least one dental prosthetic part or bracket onto a corresponding mesostructure or tooth stump so that the adhesive is pressed into the plurality of physical recesses corresponding to the plurality of virtual recesses to form said positive locking fit.

* * * * *